US012012996B2

(12) United States Patent
Chen et al.

(10) Patent No.: US 12,012,996 B2
(45) Date of Patent: Jun. 18, 2024

(54) LOCKING SYSTEM AND MANUFACTURING METHOD THEREOF, BEARING ASSEMBLY AND ROBOT HAVING THE SAME

(71) Applicant: ABB Schweiz AG, Baden (CH)

(72) Inventors: Kaiwei Chen, Shanghai (CN); Jiajie Sha, Shanghai (CN); Xiaodong Cao, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 89 days.

(21) Appl. No.: 17/904,777

(22) PCT Filed: May 18, 2020

(86) PCT No.: PCT/CN2020/090850
§ 371 (c)(1),
(2) Date: Aug. 22, 2022

(87) PCT Pub. No.: WO2021/232191
PCT Pub. Date: Nov. 25, 2021

(65) Prior Publication Data
US 2023/0069216 A1 Mar. 2, 2023

(51) Int. Cl.
*F16C 19/54* (2006.01)
*F16B 39/02* (2006.01)
(Continued)

(52) U.S. Cl.
CPC .......... *F16C 35/063* (2013.01); *F16B 39/028* (2013.01); *F16C 19/06* (2013.01);
(Continued)

(58) Field of Classification Search
CPC .. F16B 39/028; F16B 39/12; F16B 2200/506; F16C 19/06; F16C 19/546; F16C 19/547;
(Continued)

(56) References Cited

U.S. PATENT DOCUMENTS 1,669,725 A * 5/1928 Scribner ............... F16C 35/073
384/583
2,836,473 A * 5/1958 Tydeman .............. F16C 25/083
384/563
(Continued)

FOREIGN PATENT DOCUMENTS

CN 102472316 A 5/2012
CN 102748398 A 10/2012
(Continued)

OTHER PUBLICATIONS

International Search Report and Written Opinion, issued by the ISA/CN National Intellectual Property Administration; regarding corresponding patent application Serial No. PCT/CN2020/090850; dated Feb. 19, 2021; 10 pages.

*Primary Examiner* — Phillip A Johnson
(74) *Attorney, Agent, or Firm* — Greenberg Traurig, LLP

(57) ABSTRACT

A locking system and a manufacturing method thereof, a bearing assembly, and a robot having the same. The locking system incudes a first nut arranged on a shaft and adapted to contact with an upper side of an inner ring of the bearing. The locking system can also include a second nut arranged on the shaft and separated from the first nut at a predetermined distance. The locking system can include a locking screw adapted to be screwed through a first through hole of the second nut and a second through hole of the first nut while the first through hole and the second through hole are aligned with each other.

20 Claims, 3 Drawing Sheets

(51) Int. Cl.
*F16C 19/06* (2006.01)
*F16C 25/06* (2006.01)
*F16C 35/063* (2006.01)

(52) U.S. Cl.
CPC ............ *F16C 19/546* (2013.01); *F16C 25/06* (2013.01); *F16B 2200/506* (2018.08); *F16C 2226/60* (2013.01); *F16C 2322/59* (2013.01)

(58) Field of Classification Search
CPC ...... F16C 19/548; F16C 25/06; F16C 35/063; F16C 2226/60; F16C 2322/59
See application file for complete search history.

(56) References Cited

U.S. PATENT DOCUMENTS

| | | | | |
|---|---|---|---|---|
| 3,156,506 | A | * | 11/1964 | Scheifele ............. F16C 35/077 384/589 |
| 4,613,240 | A | * | 9/1986 | Hagelthorn .......... F16C 19/548 384/585 |
| 5,662,445 | A | * | 9/1997 | Harbottle ................ F16C 25/06 411/290 |
| 8,961,025 | B1 | | 2/2015 | Kobayashi |
| 2009/0145683 | A1 | | 6/2009 | Szczepanski et al. |
| 2012/0134617 | A1 | | 5/2012 | Keller et al. |
| 2014/0259673 | A1 | * | 9/2014 | Ebert .................. B60B 27/0078 29/898.07 |

FOREIGN PATENT DOCUMENTS

| | | | | |
|---|---|---|---|---|
| CN | 202746380 | U | | 2/2013 |
| CN | 203500245 | U | | 3/2014 |
| CN | 105003549 | A | | 10/2015 |
| CN | 106837977 | A | | 6/2017 |
| CN | 108591282 | A | | 9/2018 |
| CN | 208040971 | U | | 11/2018 |
| CN | 211820433 | U | | 10/2020 |
| CN | 113606238 | A * | | 11/2021 |
| DE | 2460961 | A * | 6/1976 | ............ F16B 39/028 |
| DE | 3521563 | A * | 1/1986 | ............ F16B 39/028 |
| DE | 112008001321 | T5 * | 5/2010 | ............ F16C 19/54 |
| DE | 102014213040 | A1 | | 6/2015 |
| DE | 102014002192 | A1 | | 8/2015 |
| GB | 510144 | A | | 7/1939 |
| JP | 2005061433 | A * | 3/2005 | ............ F16C 19/166 |
| JP | 2015034077 | A | | 2/2015 |

* cited by examiner

LOCKING SYSTEM AND MANUFACTURING METHOD THEREOF, BEARING ASSEMBLY AND ROBOT HAVING THE SAME

CROSS-REFERENCE TO RELATED APPLICATIONS

This is a national stage application which claims priority to International patent application Serial No.: PCT/CN2020/090850, filed on May 18, 2020; and which is herein incorporated by reference in its entirety.

FIELD

Embodiments of the present disclosure generally relate to a locking system and a manufacturing method thereof, a bearing assemble and a robot having the same.

BACKGROUND

Rolling bearings usually retain some internal clearance. The internal clearance may be referred to as a clearance between an inner bearing ring, a bearing roller and an outer bearing ring, which may be defined as a total distance through which the inner bearing ring can be moved relative to the outer bearing ring in the radial direction and or in the axial direction.

In some case, it is desirable to keep them internally stressed. A preload is usually applied to bearings in which the clearance can be adjusted during mounting. However, the amount of preload should be wisely chosen to balance the lifetime and the performance of bearing. And should be kept unchanged during the usage period of the bearing. Thus, an adjustable locking structure is necessary for preloading bearing.

SUMMARY

Embodiments of the present disclosure provide a locking system and a manufacturing method thereof, a bearing assemble and a robot having the same.

In a first aspect, a locking system is provided. The locking system comprises a first nut arranged on a shaft and adapted to contact with an upper side of an inner ring of the bearing. The locking system further comprises a second nut arranged on the shaft and separated from the first nut at a predetermined distance. The locking system also comprises at least one locking screw adapted to be screwed at least through a first through hole of the second nut and a second through hole of the first nut while the first through hole and the second through hole are aligned with each other, to thereby apply a force to a bearing on the shaft along an axial direction of the shaft.

The solution of the first aspect proposes a locking mechanism for the bearing assembly. By means of two nuts arranged on the shaft and a locking screw screwed into the through holes of both nuts, a suitable preload could be provided to the bearing. In this way, a reliable fasten solution could be achieved, which may maintain the preload unchanged during the operating of the bearing assembly. Furthermore, this locking structure is easy for assembly and disassembly.

In some embodiments, the first nut is adapted to be screwed onto the shaft to apply a first torque to the bearing along the axial direction. The at least one locking screw is adapted to be screwed through the first through hole and the second through hole to apply a second torque to the bearing along the axial direction.

In some embodiments, the predetermined distance is set to be within a range of 1-2 pitches.

By applying the first torque and the second torque, the amount of preload can be controlled through the torque of nuts and the locking screws, to meet mounting requirements of the bearing assembly.

In some embodiments, the first through hole and the second through hole are arranged along the axial direction.

In some embodiments, the second through hole can be formed as a threaded hole.

In some embodiments, the at least one locking screw comprises a first locking screw adapted to be screwed through the first through hole and the second through hole while the first through hole and the second through hole are aligned with each other; a second locking screw adapted to be screwed through a third through hole of the second nut and a fourth through hole of the first nut while the fourth through hole and the fifth through hole are aligned with each other and a third locking screw adapted to be screwed through a fifth through hole of the second nut and a sixth through hole of the first nut while the fifth through hole and the sixth through hole are aligned with each other.

In some embodiments, the first, the third and the fifth through hole are arranged along the axial direction and adapted to be distributed at an equal interval in a first circumferential direction of the second nut and the second, the fourth and the sixth through hole are arranged along the axial direction and adapted to be distributed at an equal interval in a second circumferential direction of the first nut.

In some embodiments, the second, the fourth and the sixth through hole are formed as a threaded hole.

By the arrangement of a plurality of locking screws in the locking system and the distribution of those locking screws on the nuts, the locking force applied to the bearing can be balanced, so that the locking system may guarantee a tight fastening force for the bearing.

In some embodiments, while the at least one locking screw is screwed into the first through hole and the second through hole, the at least one locking screw is further adapted to apply the force to a further bearing via a spacer arranged between the bearing and the further bearing.

The locking system can be utilized for the bearing assembly with various structures, and therefore provide a broad applicability and flexibility for the mounting environment.

In some embodiments, the at least one locking screw is a countersunk head screw.

In a second aspect, a bearing assembly is provided. The bearing assembly comprises a shaft, a bearing arranged on the shaft and a locking system according to the first aspect.

By using the locking system to the bearing assembly, a preload applied to the axial direction of the shaft can be guaranteed, which balance the lifetime and the performance of bearing.

In some embodiments, the bearing assembly further comprises a further bearing arranged on the shaft and to be separated with the bearing through a spacer arranged between the bearing and the further bearing.

In a third aspect, a robot is provided. The robot comprises at least one bearing assembly of the second aspect.

In a fourth aspect, a manufacturing method of locking system according to the first aspect is provided.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

Throughout the drawings, the same or similar reference symbols are used to indicate the same or similar elements.

DETAILED DESCRIPTION

Figure 1:
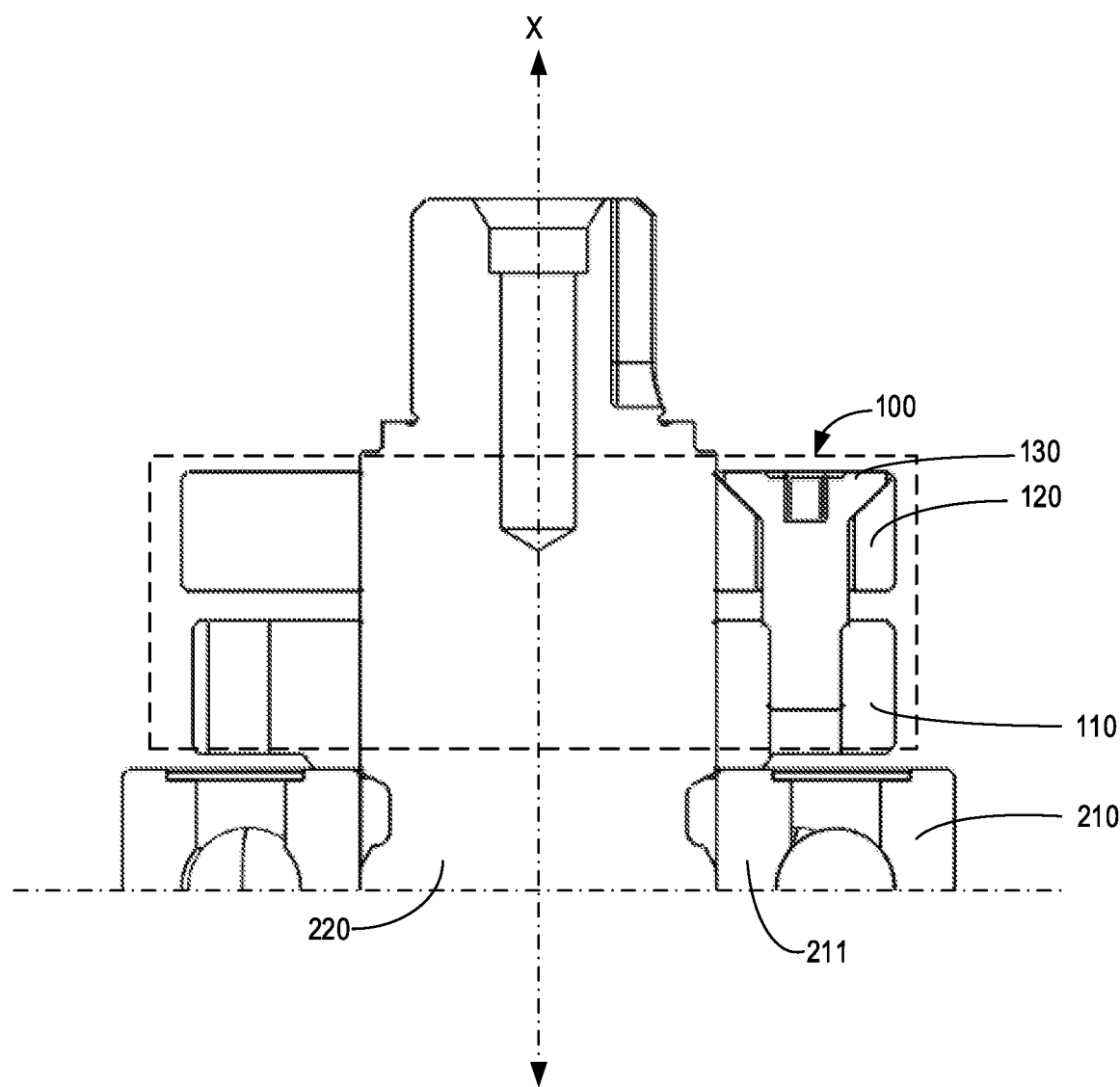
FIG. 1 illustrates a sectional view of an example of the locking system in accordance with embodiments of the present disclosure.

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the figures. Other definitions, explicit and implicit, may be included below.

As mentioned above, rolling bearings usually retain some internal clearance. The internal clearance may be referred to as a clearance between an inner bearing ring, a bearing roller and an outer bearing ring, which may be defined as a total distance through which the inner bearing ring can be moved relative to the outer bearing ring in the radial direction and or in the axial direction.

In some case, it is desirable to keep them internally stressed. A preload is usually applied to bearings in which the clearance can be adjusted during mounting. However, the amount of preload should be wisely chosen to balance the lifetime and the performance of bearing. And should be kept unchanged during the usage period of the bearing. Thus, an adjustable locking structure is necessary for preloading bearing.

In conventional way, some approaches have been used for apply the preload. For example, a nut can be used for fastening the bearing. In order to maintain the stability of the nut, glue may be added on the nut. However, the nut may get loose before the glue is completely solidified. Meanwhile the nut may be difficult to be disassembled.

It has been considered using two nuts to apply the preload. The two nuts are fastened in the same direction, so it still easy to get loose. It is also hard to control the amount of preload.

Therefore, the embodiments of the present disclosure provide a locking system having two nuts arranged on the shaft and a locking screw screwed into the through holes of both nuts. In this way, a reliable fasten solution could be achieved, which may maintain the preload unchanged during the operating of the bearing assembly. Furthermore, this locking structure is easy for assembly and disassembly.

Principle and implementations of the present disclosure will be described in detail below with reference to FIGS. 1 to 3. FIG. 1 illustrates a sectional view of an example of the locking system in accordance with embodiments of the present disclosure.

As shown in FIG. 1, the locking system 100 may comprise a first nut 110. The first nut 110 may be arranged on a shaft 220, on which a bearing 210 is arranged. A lower side of the first nut 110 may contact with an upper side of the inner ring 211 of the bearing 210. In some embodiments, the first nut 110 can be screwed onto the shaft 220, to apply a first torque to the bearing 210.

The locking system 100 may further comprise a second nut 120. The second nut 120 may be arranged on the shaft 220 and separated from the first nut 110 at a predetermined distance. For example, the predetermined distance is set to be within a range of 1-2 pitches.

The locking system 100 may further comprise a locking screw 130. A first through hole may be arranged on the second nut 110 along the axial direction X of the shaft 220 and a second through hole may be arranged on the first nut 120 along the axial direction X. The locking screw 130 can be screwed into the first through hole and the second through hole while the first through hole and the second through hole are aligned with each other, to apply a locking force to the bearing on the shaft 220 along an axial direction X. In some embodiments, the second through hole can be formed as a threaded hole, to maintain the fastening force.

In some embodiments, the locking screw 130 may be adapted to be screwed through the first through hole and the second through hole to apply a second torque to the bearing along an axial direction X, to generate an expected locking force to the bearing 120 in corporation with the first torque generated by screwing the first nut 110 onto the shaft 220.

For example, the expected locking force can be predetermined or preset according to the mounting requirement of the bearing assembly. To achieving the expected locking force, assuming that a total torque to be applied from the locking system is set to as T, a first torque T1, which may be slightly bigger than T, can be applied to the first nut 110 first, then a suitable T2, applied by the locking screw may be chosen for reduce the total torque to the predetermined total torque T.

The structure of the locking system for the bearing assembly can provide, by means of two nuts arranged on the shaft and a locking screw screwed into the through holes of both nuts, a suitable preload c to the bearing. In this way, a reliable fasten solution could be achieved, which may maintain the preload unchanged during the operating of the bearing assembly.

Furthermore, this locking structure is easy for assembly and disassembly and a desire preload for the bearing can be flexible adjusted without changing the structure of the locking system.

In some embodiments, the locking system 100 may comprises a plurality of locking screws. FIG. 2 illustrates a top view of an example of the locking system according to embodiments of the present disclosure. As shown in FIG. 2, the locking system 100 may comprises a first locking screw 1301, a second locking screw 1302 and a third locking screw.

As shown, the second nut 120 may comprise third through holes, namely a first through hole, a third through hole and a fifth through hole. Although the first nut 110 cannot be seen in FIG. 2, it is to understood that the first nut may also comprise third through holes, namely a second through hole, a fourth through hole and a sixth through hole. In some embodiments, each of the second through hole, fourth through hole and the sixth through hole can be formed as a threaded hole.

In some embodiments, the first, the third and the fifth through hole may be arranged along the axial direction X and adapted to be distributed at an equal interval in a first circumferential direction R1 of the second nut 120 and the second, the fourth and the sixth through hole may be arranged along the axial direction X and adapted to be distributed at an equal interval in a second circumferential direction R2 of the first nut 120.

In some embodiments, the first locking screw 1301 may be adapted to be screwed through the first through hole and the second through hole while the first through hole and the second through hole are aligned with each other. Similarly, the second locking screw 1302 may be adapted to be screwed through the third through hole and the fourth through hole while the fourth through hole and the fifth through hole are aligned with each other and the third locking screw 1303 may be adapted to be screwed through the fifth through hole and the sixth through hole while the fifth through hole and the sixth through hole are aligned with each other.

By the arrangement of a plurality of locking screws in the locking system and the distribution of those locking screws on the nuts, the locking force applied to the bearing can be balanced, so that the locking system may guarantee a tight fastening force for the bearing.

Figure 3:
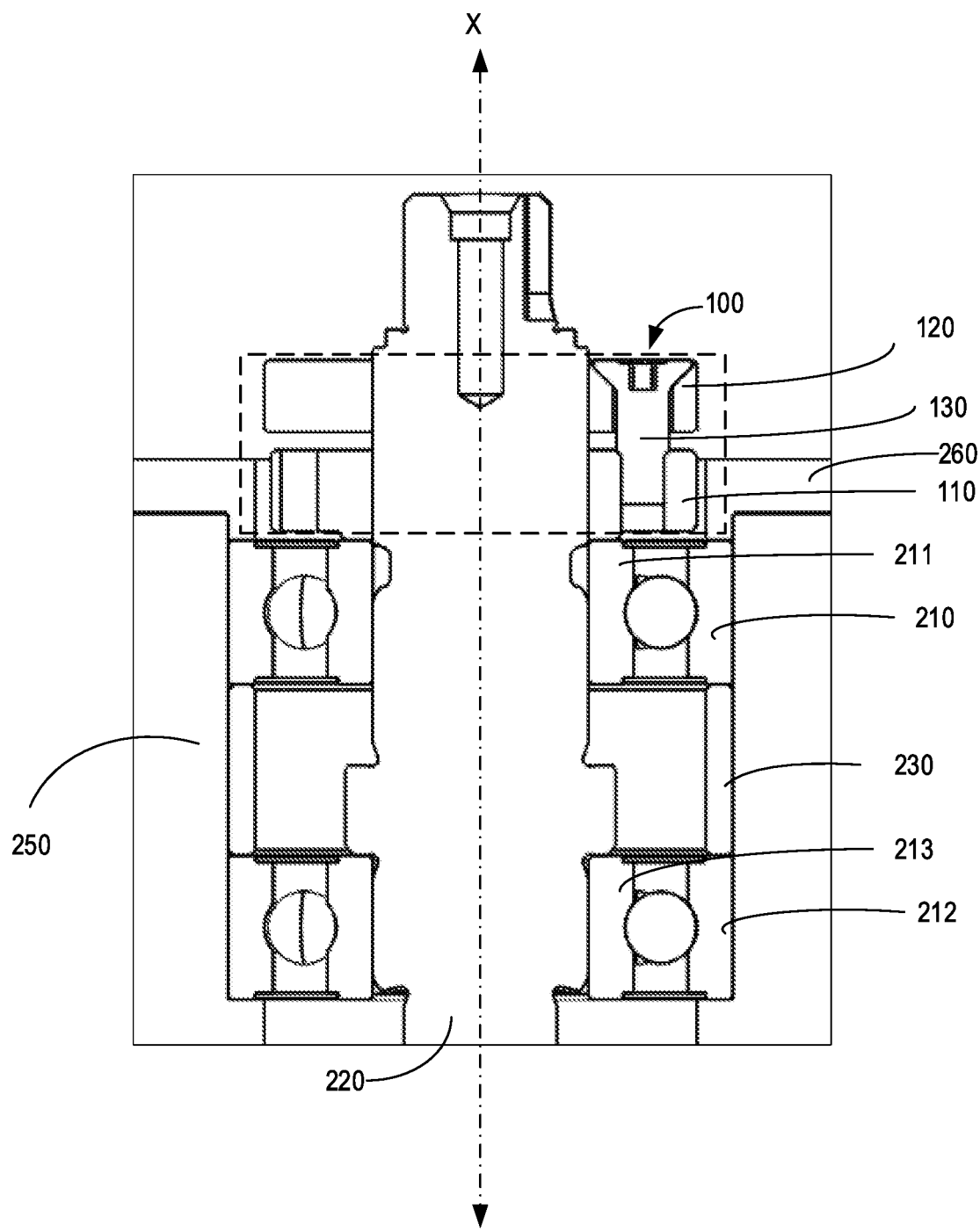
FIG. 3 shows a sectional view of an example of a bearing assembly having the locking system in accordance with embodiments of the present disclosure.

FIG. 3 shows a sectional view of an example of a bearing assembly having the locking system in accordance with embodiments of the present disclosure. With reference to FIG. 3, an example of the bearing assembly having the locking system will be further described.

As shown in FIG. 3, the bearing assembly may comprise a shaft 220, which may extend through a main body 250 of the bearing assembly and may rotate in the main body 250 around the axial direction X.

A first bearing 210 and a second bearing 212 may be arranged on the shaft 220. There is a spacer 230 between the first bearing 210 and the second bearing 212, to separate them with each other. For example, the spacer 230 may be formed as a ring shim. The spacer 230 may contact the outer rings of the first bearing 210 and the second bearing 220.

Figure 2:
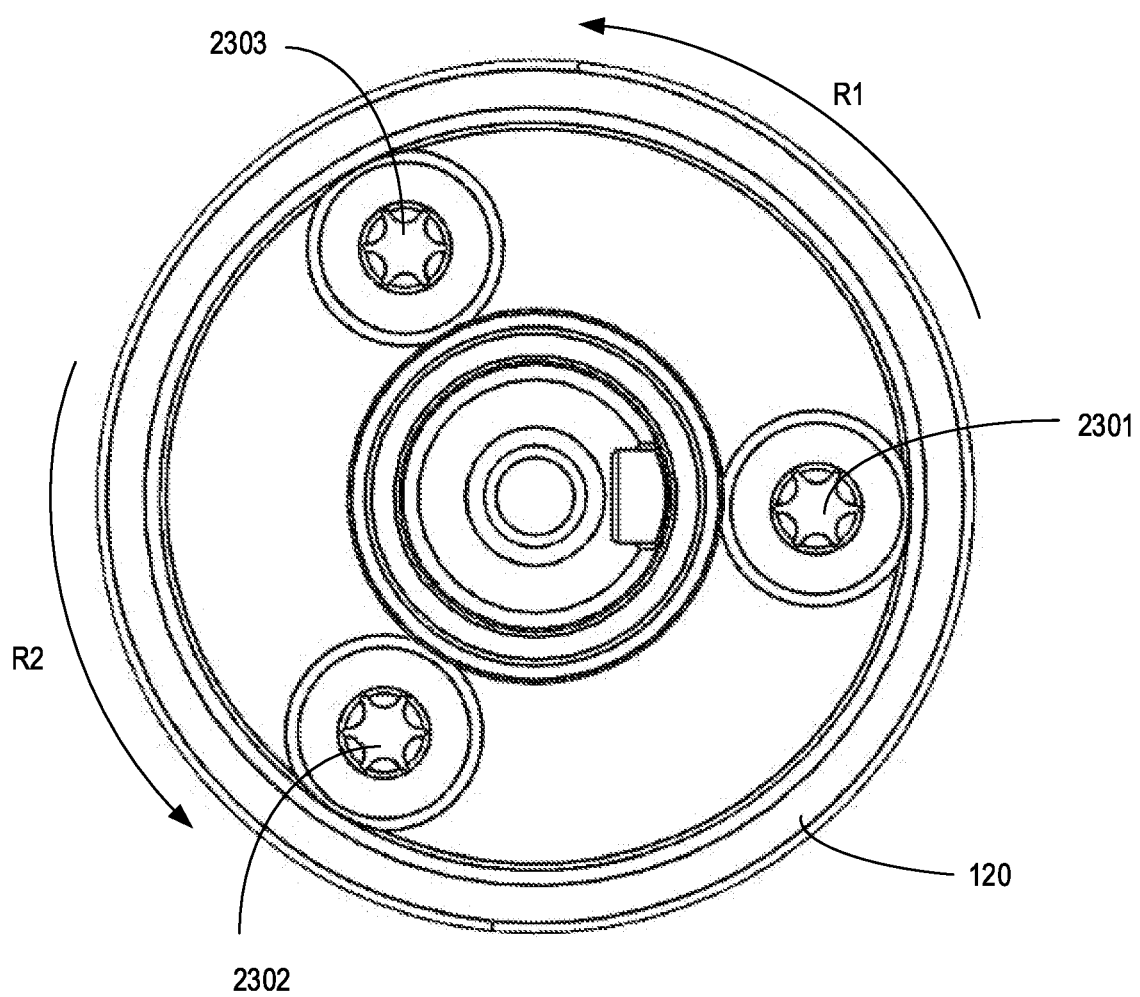
FIG. 2 illustrates a top view of an example of the locking system according to embodiments of the present disclosure.

The locking system 100 for the bearing assembly may be similar with the FIG. 2. As mentioned in FIG. 2, the locking screw 130 can be screwed into the first through hole of the second nut 120 and the second through hole of the first nut 110 while the first through hole and the second through hole are aligned with each other, to apply a locking force to the bearing 210 on the shaft 220 along an axial direction X.

As shown in FIG. 3, while the locking screw 130 is screwed into the first through hole and the second through hole, the locking screw 130 may further apply the force to a the second bearing 212 via the spacer 230 arranged between the bearing 210 and the bearing 212.

The locking system can be utilized for the bearing assembly with various structures. For example, the bearing assembly may comprise any suitable number of bearing. Therefore, the locking system may provide a broad applicability and flexibility for the mounting environment.

Furthermore, as shown, the locking system may also comprise a stopper arranged on the shaft 220 and adapted to contact with a lower side of an inner ring of the bearing 212. The stopper may be adapted to limit a position of the bearing 212 while the locking force is applied by the locking system.

For example, the stopper may be formed as a ring element arranged on the shaft. As an option, the stopper may be formed as a ring flange or step on the shaft. The stopper may also be considered as a part of the shaft.

It is to be understood that the stopper may also be arranged at a lower side of the inner ring of the bearing 210 if only one bearing 210 is arranged on the shaft 220.

Furthermore, the bearing assembly may also comprise a fix cap 260 mounted on the main body 250 and adapted to contact the upper side of the outer ring of the bearing 210, to further fix the position of the bearing 210 along the axial direction X.

In some embodiments, the locking screw 130 may be a countersunk head screw, to save mounting space.

In this way, a reliable fasten solution could be achieved, which may maintain the preload unchanged during the operating of the bearing assembly. Furthermore, this locking structure is easy for assembly and disassembly.

The present disclosure may also provide a robot mechanism. The bearing assembly having the locking system as mentioned above may be arranged on the portion of the robot, such as the operating arm, supporting element, etc.

Further, the present disclosure also provides a manufacturing method of the locking system. For example, the method may comprise providing first nut arranged on a shaft and adapted to contact with an upper side of an inner ring of the bearing; providing a second nut arranged on the shaft and separated from the first nut at a predetermined distance and providing at least one locking screw adapted to be screwed at least through a first through hole of the second nut and a second through hole of the first nut while the first through hole and the second through hole are aligned with each other, to thereby apply a force to a bearing on the shaft along an axial direction of the shaft.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:
1. A locking system comprising:
  a first nut arranged on a shaft and adapted to contact with an upper side of an inner ring of the bearing;

a second nut arranged on the shaft and separated from the first nut at a predetermined distance; and at least one locking screw adapted to be screwed at least through a first through hole of the second nut and a second through hole of the first nut while the first through hole and the second through hole are aligned with each other, to thereby apply a force to a bearing on the shaft along an axial direction of the shaft.

2. The locking system of claim 1, wherein the first nut is adapted to be screwed onto the shaft to apply a first torque to the bearing along the axial direction, and the at least one locking screw is adapted to be screwed through the first through hole and the second through hole to apply a second torque to the bearing along the axial direction.

3. A bearing assembly comprising:
a shaft;
a bearing arranged on the shaft; and
the locking system according to claim 2.

4. The locking system of claim 1, wherein the predetermined distance is set to be within a range of 1-2 pitches.

5. The locking system of claim 1, wherein the first through hole and the second through hole are arranged along the axial direction.

6. A bearing assembly comprising:
a shaft;
a bearing arranged on the shaft; and
the locking system according to claim 5.

7. The locking system of claim 1, wherein the second through hole are formed as a threaded hole.

8. A bearing assembly comprising:
a shaft;
a bearing arranged on the shaft; and
the locking system according to claim 7.

9. The locking system of claim 1, wherein the at least one locking screw comprises:
a first locking screw adapted to be screwed through the first through hole and the second through hole while the first through hole and the second through hole are aligned with each other,
a second locking screw adapted to be screwed through a third through hole of the second nut and a fourth through hole of the first nut while the fourth through hole and the fifth through hole are aligned with each other; and
a third locking screw adapted to be screwed through a fifth through hole of the second nut and a sixth through hole of the first nut while the fifth through hole and the sixth through hole are aligned with each other.

10. The locking system of claim 9, wherein the first, the third and the fifth through hole are arranged along the axial direction and adapted to be distributed at an equal interval in a first circumferential direction of the second nut;

the second, the fourth, and the sixth through hole are arranged along the axial direction and adapted to be distributed at an equal interval in a second circumferential direction (R2) of the first nut.

11. A bearing assembly comprising:
a shaft;
a bearing arranged on the shaft; and
the locking system according to claim 10.

12. The locking system of claim 9, wherein the second, the fourth, and the sixth through holes are formed as a threaded hole.

13. A bearing assembly comprising:
a shaft;
a bearing arranged on the shaft; and
the locking system according to claim 12.

14. A bearing assembly comprising:
a shaft;
a bearing arranged on the shaft; and
the locking system according to claim 9.

15. The locking system of claim 1, wherein while the at least one locking screw is screwed into the first through hole and the second through hole, the at least one locking screw is further adapted to apply the force to a further bearing via a spacer arranged between the bearing and the further bearing.

16. A bearing assembly comprising:
a shaft;
a bearing arranged on the shaft; and
the locking system according to claim 15.

17. The locking system of claim 1, wherein the at least one locking screw is a countersunk head screw.

18. A bearing assembly comprising:
a shaft;
a bearing arranged on the shaft; and
the locking system according to claim 1.

19. The bearing assembly of claim 18 further comprising:
another bearing arranged on the shaft and configured to be separated with the bearing through a spacer arranged between the bearing and the another bearing.

20. A robot comprising at least one bearing assembly according to claim 18.

* * * * *